United States Patent

[11] 3,631,729

| [72] | Inventor | Alvin G. Moore |
| | | Cumberland, Md. |
| [21] | Appl. No. | 830,826 |
| [22] | Filed | June 5, 1969 |
| [45] | Patented | Jan. 4, 1972 |
| [73] | Assignee | Hercules Incorporated |
| | | Wilmington, Del. |

[54] FLUID JET DEFLECTION-TYPE INSTRUMENT WITH JET BUOYANCY CONTROL
4 Claims, 4 Drawing Figs.

[52] U.S. Cl. ............................................. 73/516
[51] Int. Cl. ...................................... G01p 15/00
[50] Field of Search .............................. 73/505, 515, 516; 137/81.5; 33/205.6 T

[56] References Cited
UNITED STATES PATENTS

| 1,841,607 | 1/1932 | Kollsman | 73/180 |
| 3,201,999 | 8/1965 | Byrd | 73/515 |
| 3,205,715 | 9/1965 | Meek | 73/516 |
| 3,310,985 | 3/1967 | Belsterling et al. | 73/515 |
| 3,324,730 | 6/1967 | Bowles | 73/515 |
| 3,500,690 | 3/1970 | Schuemann | 73/516 |

*Primary Examiner*—Richard C. Queisser
*Assistant Examiner*—Herbert Goldstein
*Attorney*—Michael B. Keehan ABSTRACT: An instrument wherein the deflection of a fluid jet induced, for example, by the angular movement of the instrument produces a signal proportional to the deflection; and particularly, such an instrument having means for adjusting the temperature of the fluid to control the buoyancy of the jet relative to the surrounding fluid. This expedient is used, for example, to balance the density of the jet fluid and the surrounding fluid to neutralize the buoyancy of the jet and thereby eliminate jet deflection induced by acceleration, or to induce a predetermined temperature differential between the jet fluid and the surrounding fluid and thus through induced buoyance, to render the instrument responsive to acceleration.

PATENTED JAN 4 1972

3,631,729

ALVIN G. MOORE
*INVENTOR*

BY William J. Smith

AGENT

FLUID JET DEFLECTION-TYPE INSTRUMENT WITH JET BUOYANCY CONTROL

This invention relates to a fluid-jet-deflection-type instrument, that is, an instrument wherein a fluid jet is adapted to be deflected from a centered condition relative to a sensing means, the magnitude and the direction of the deflection being measured to produce an output signal to indicate the magnitude and direction of the force or influence inducing the deflection.

An example of a fluid-jet-deflection-type instrument is the angular movement sensing device forming the subject matter of copending U.S. Pat. application Ser. No. 632,239, filed Apr. 20, 1967, now U.S. Pat. No. 3,500,691 dated Mar. 17, 1970. In this device, the deflection of a laminar flow fluid jet from the centered condition relative to the sensing means is produced by the lateral movement of the sensing means during the interval of time that an increment of fluid is in transit in the jet from the nozzle to the sensing means, and the amount and direction of the deflection is an indication of the rate and the direction of the angular movement.

The accuracy of the angular movement sensing device is to some extent dependent upon the deflections of the fluid jet that may result from, among other things, acceleration including gravity. More particularly, when the fluid in the jet has a density that is different from the density of the surrounding fluid the jet will have a buoyancy that may be either positive or negative, depending upon whether the jet fluid is less or more dense respectively than the surrounding air. The amount of the error that results from acceleration-induced deflection of the jet varies with the orientation of the instrument relative to the acceleration forces. With respect to gravity-induced deflection, which may be used for purposes of illustration, there is a minimum error with a horizontal arrangement of the axis of sensitivity of the instrument that is, a horizontal arrangement of the plane in which the angular movement is measured. When so arranged, the two thermistor-sensing elements are disposed in a horizontal plane so that as the jet dips or rises because of gravity, the jet deflection will have a uniform effect upon each sensing element. The maximum error occurs when the axis of sensitivity of the instrument is vertical, that is, with the two sensing elements disposed in a vertical plane. Thus, when the jet dips or rises because of gravity, the jet deflection moves the jet away from the one thermistor and toward the other in the same manner as an angular movement and is thus read as a movement.

Application Ser. No. 632,238 filed Apr. 20, 1967, now U.S. Pat. No. 3,500,690 dated Mar. 17, 1970 relates to an expedient for introducing into the jet-surrounding space fluid from the same source that is used to supply fluid to the jet. In addition to avoiding a cyclical flow of fluid in the space surrounding the jet that is caused by aspiration induced by the jet, there is also eliminated any temperature differential between the fluid in the jet and in the jet-surrounding space. The fluids thus have substantially the same density which also substantially eliminates any gravity-induced deflection that is caused by a difference in the temperature and thus in the density of the fluids.

In an instrument in which the total deflection of the jet at the sensing elements to produce the maximum reading for which the instrument was designed, or in other words, a full scale reading of the instrument, is less than about 1 millimeter, minute deflections of the jet result in significant errors in the output signal. While the gravity-induced error produced by a temperature differential between the fluid in the jet and the surrounding fluid would appear to be obviated by the expedient of the above-noted Pat. application, Ser. No. 632,238, there are other and apparently different sources of gravity sensitivity in the instrument. It may be that such sensitivity is induced by local hot or cold spots which produce a fluid that is not homogeneous temperaturewise, or by some influence arising because of manufacturing tolerances, or because of local convection currents about the thermistors. In any event, such instruments are found to have an actual or apparent gravity sensitivity. While the source of the error may not be fully understood, it has been found that, in accordance with this invention, it can be neutralized by adjusting the temperature of the fluid as herein contemplated.

It has also been found that the instrument can be adapted for measuring acceleration other than gravity by inducing a predetermined temperature differential between the jet fluid and the surrounding fluid so that the jet has a predetermined buoyancy. Thus, the jet will normally rise or fall a predetermined amount as it travels from the nozzle to the sensing means, which amount will vary with the acceleration imposed thereon. A further effect that can be achieved in an instrument having means such as a heater for adjusting the temperature of the fluid in the jet relative to that of the surrounding fluid is that the instrument may be used as an angular movement sensing device wherein the heater may be used to neutralize the gravity sensitivity if required, and may be converted to an accelerometer by energizing the heater to provide a predetermined temperature differential.

In accordance with the above, the objects of this invention are to provide means in a fluid-jet-deflection-type instrument for reducing or neutralizing gravity sensitivity and, alternatively, for inducing acceleration sensitivity. Further objects of this invention are to provide such a means that is simple, inexpensive, trouble-free and which require a minimum of power to operate. The specific objects of this invention are to provide means for adjusting the temperature of the jet fluid relative to that of the surrounding fluid in a fluid-jet-type instrument for neutralizing gravity sensitivity or to induce a predetermined temperature differential whereby the instrument is made sensitive to acceleration.

The above objects have been achieved in a fluid-jet-deflection-type instrument of the type forming the subject matter of copending U.S. Pat. application, Ser. No. 830,825, filed June 5, 1969, preferably by an electrical heating element which may be, for example, a conventional patch-type strain gauge to which the fluid is exposed as it moves to the input of the jet-forming nozzle. When the heating element is energized, it heats the fluid flowing over the same. By locating the heating element so that only the fluid to the nozzle is heated, a temperature differential is induced relative to the fluid that is supplied to the space surrounding the jet.

When the above and other objects in view, the present invention is hereinafter described with reference to the accompanying drawings, in which.

Figures 1, 2, 3, 4:
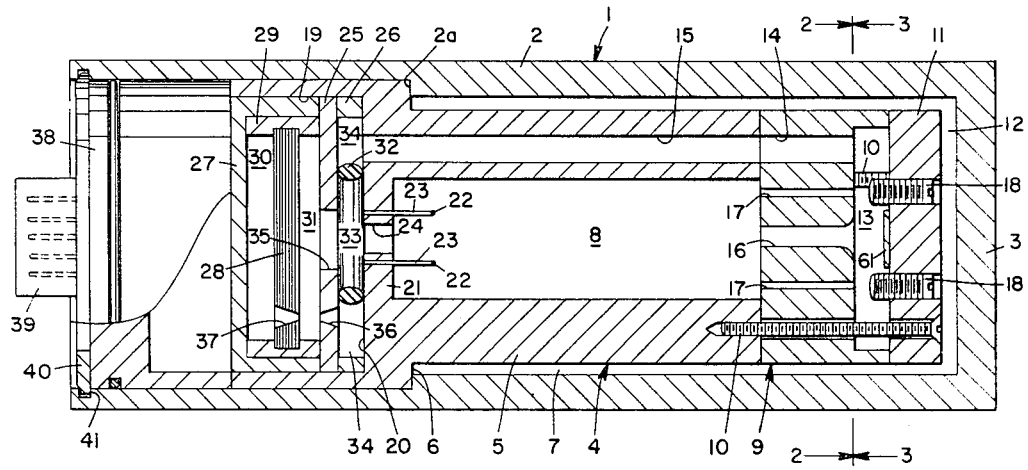
FIG. 1 is a sectional view longitudinally of an instrument embodying the present invention.
FIG. 2 is a transverse sectional view taken substantially on the line 2—2 of FIG. 1.
FIG. 3 is a transverse sectional view taken substantially on the same line of FIG. 1 as FIG. 2 but looking in the opposite direction, that is, as indicated by the arrows 3—3.
FIG. 4 is a circuit diagram of the thermistor circuit of the apparatus of FIG. 1.

With reference to the drawings, there is illustrated a fluid jet deflection type instrument comprising a housing 1 including a cylindrical sidewall 2 having internally thereof a shoulder 2a and closed at the one end thereof by an end wall 3. A unit 4 is inserted into the housing 1 from the open end thereof, the unit 4 comprising a body 5 having a shoulder 6 that is adapted to be seated against the shoulder 2a for positioning the unit 4 endwise in the housing 1. From the shoulder 6 outwardly to the open end of the housing 1, the body 5 has an external diameter that is adapted to be received within the sidewall 2 with a relatively close fit for supporting the body 5. The body 5 is preferably secured within the housing 1 as by an adhesive applied at these opposed supporting surfaces. Inwardly of the housing 1 from the shoulder 6, the external diameter of the body 5 is smaller than the internal diameter of the sidewall 2 whereby that portion of the body 5 is supported in cantilever fashion relative to the sidewall 2 to provide an annular space 7 therebetween.

The body 5 has a cylindrical jet chamber 8 extending inwardly axially thereof from the end adjacent the end wall 3 of the housing 1. A nozzle member 9 is secured to the nozzle end of the body 5 by screws 10 that extend through an end plate 11 and the nozzle member 9 and are threaded into the body 5. The screws 10 are arranged radially outwardly of the body 5 from and about the periphery of the jet chamber 8 and there are preferably three of the screws 10 equally spaced angularly about the axis of the unit 4. The external diameter of the nozzle member 9 and end plate 11 is comparably to that of the adjacent portion of the body 5 whereby they are spaced inwardly from the housing 1 to continue the annular space 7. The body 5, nozzle member 9 and end plate 11 are dimensioned lengthwise relative to the housing 1 to space the end plate 11 from the end wall 3 to provide a clearance 12 therebetween.

The nozzle member 9 is formed with a cavity extending axially inwardly from the end thereof adjacent to the end plate 11 to provide a plenum chamber 13 between the bottom of the cavity and the adjacent face of the end plate 11. Fluid is supplied to the plenum chamber 13 by a plurality of fluid inlets 14 in the form of bores in the nozzle member 9, each of which inlets 14 is open at one end into the plenum chamber 13 and is connected at the other end to a bore 15 aligned axially with the respective inlet 14, the bores 15 being formed endwise of the body 5 and spaced radially from the axis of the unit 4 outwardly of the jet chamber 8. There are preferably three of the inlets 14 and bores 15 equally spaced angularly about the axis of the unit 4 intermediate the screws 10 as can be seen in FIG. 3.

A nozzle 16 is formed in the nozzle member 9 with the inlet end thereof open into the plenum chamber 13 and the output end open into the jet chamber 8. The nozzle 16 is arranged to direct a fluid jet endwise of the jet chamber 8 substantially along the axis thereof, or, in other words, is aligned axially with the jet chamber 8. A plurality of vents 17 are formed through the nozzle member 9 between the plenum chamber 13 and the jet chamber 8. The vents 17, which are disclosed and claimed in U.S. Pat. application, Ser. No. 632,238, surround the nozzle 16 and function to introduce fluid into the jet chamber 8 in the space surrounding the jet, thereby preventing a cyclical or counterflow of fluid in the jet chamber 8 in the space surrounding the jet, which counterflow is induced by aspiration by the jet. At the same time, by supplying the fluid from the same source to both the jet and the jet-surrounding space in the jet chamber 8, there is substantially eliminated any temperature or density differential between the fluids which would make the device gravity or acceleration sensitive.

The end plate 11 is provided with a plurality of setscrews 18 threaded therethrough on axes substantially parallel to and arranged symmetrically about the axis of the nozzle 16. The leading ends of the screws 18 extend into the plenum chamber 13 and serve to alter the flow pattern of the fluid from the inlets 14 to the nozzle 16. The screws 18 thus provide for adjustment of the jet to compensate for variations arising, for example, from manufacturing tolerances and thus for centering the jet initially. After the jet is adjusted, the screws may be locked in the adjusted position, for example, by an adhesive such as an epoxy deposited over the head thereof. The body 5 is provided with a cavity 19 extending axially inwardly thereof from the end opposite from the nozzle end of the jet chamber 8. The cavity 19 terminates at a bottom wall 20 that is spaced from the bottom wall of the jet chamber 8 by a partition 21. The sensing means of the instrument as illustrated consists of a pair of thermistors 22 that are secured as by an adhesive to the free ends of a pair of glass rods or posts 23 mounted and adhesively fixed in bores in the partition 21. The thermistors 22 are substantially centered relative to the axis of the nozzle 16 and are spaced apart a distance relative to the cross section of the jet whereby they are disposed on opposite sides of the center of the jet. When the jet is deflected, the fluid passing over the thermistors will increase or decrease, depending upon whether the center of the jet is moved toward or from the respective thermistor. The partition 21 is also provided with a plurality of exhaust ports 24, only one of which is shown in FIG. 1, which ports 24 are disposed symmetrically relative to the thermistors 22 for exhausting the fluid from the jet chamber 8 with a minimum of turbulence. The posts 23 serve to space the thermistors 22 from the partition 21 so that the jet will flow smoothly relative thereto.

The pump means is disposed in the cavity 19 of the body 5, which pump means comprises an orifice plate 25 that is positioned in spaced relation relative to the bottom wall 20 of the cavity 19 by a ringlike spacer 26. The pump means also includes a cup-shaped end piece having an end wall 27 that closes the end of the cavity 19, and a pump plate 28 that is mounted between and in spaced relation to the end wall 27 and the orifice plate 25 by a spacer 29. The pump plate 28 is mounted in an internal groove in the spacer 29, which, for assembly purposes, may be resilient so that it can be deformed over the edge of the pump plate 28. The spacer 29 also serves to hold the pump plate 28 without confining it too severely and thus inhibiting the vibration thereof. By way of example, the spacer 29 may be made of a relatively hard rubber. The various elements are preferably secured adhesively in the assembled relation.

The space between the end wall 27 and the pump plate 28 constitutes a pump chamber 30 while the space between the pump plate 28 and the orifice plate 25 constitutes an intake chamber 31. The space between the orifice plate 25 and the bottom wall 20 of the cavity 19 is separated by a divider in the form of an O-ring 32 into a centrally located exhaust chamber 33 and an annular pressure chamber 34 surrounding the same. The orifice plate 25 is provided at the center thereof with an exhaust opening 35 interconnecting the exhaust chamber 33 and the intake chamber 31. The orifice plate 25 is also provided with an outlet orifice 36 adjacent the periphery thereof that interconnects the intake chamber 31 and the pressure chamber 34. The pump plate 28 is provided with a pump orifice 37 that is directly opposed across the inlet chamber 31 from the outlet orifice 36 of the orifice plate 25.

The illustrated pump means, which is like that forming the subject matter of U.S. Pat. application Ser. No. 830,830, filed June 5, 1969, comprises a pair of laminated disclike piezoelectric crystals which are adapted to be energized by voltage of opposite polarity whereby when the one crystal is expanded, the other is contracted. The pump plate 28 is thus caused to buckle with the contracting crystal at the concave side and the expanding crystal at the convex side. When the polarity of the voltage on the crystals is reversed, the pump plate 28 buckles in the opposite direction. The crystals are adapted to be energized by an oscillator (not shown) which periodically reverses the voltage to the crystals, for example, at a frequency of 2,800 cycles per second.

As the pump plate 28 buckles to enlarge the volume of the pump chamber 30, fluid is drawn into the pump chamber from the intake chamber 33 through the orifice 37. As the pump plate 28 buckles to decrease the volume of the pump chamber 30, a charge of air is expelled through the pump orifice 37. This charge of air has sufficient energy to carry across the intake chamber 33 and through the outlet orifice 36 into the pressure chamber 34. The orifices 36 and 37 are preferably oriented angularly intermediate a pair of the bores 15. Thus, the charge of air impinges on a blank face at the wall 20 and is dispersed throughout the pressure chamber 34 to move uniformly through the bores 15 and inlets 14 into the plenum chamber 13. From the plenum chamber 13, the fluid passes through the nozzle 16 and vents 17 into the jet chamber 8. After passing endwise of the jet chamber 8 over the thermistors 22, the fluid is exhausted through the ports 24 into the exhaust chamber 33 and from the chamber 33 through the exhaust opening 35 into the inlet chamber 31 from which it is drawn by the pump and recirculated.

The open end of the housing 1 is closed by an end cap 38 including an electrical connector 39, which cap is secured in the housing 1 by an expansion ring 40 that cooperates with a groove 41 internally of the housing 1. The electrical components of the instrument, that is, the thermistors 22 and pump plate 37, are wired to the connector 39 which provides for connecting the same externally to an appropriate electrical circuit such as that illustrated in FIG. 4.

The illustrated electrical circuit is the same as that included in the invention disclosed and claimed in the above noted application, Ser. No. 632,239. In the illustrated circuit, the thermistors 22 are illustrated at 42 and 43. The battery 44 represents a source of electric power that is supplied to the circuit by way of a power lead 45 and a ground lead 46. The thermistor 42 is connected in one leg of a bridge 47 with a resistor 48. The other leg of the bridge 47 comprises a pair of resistors 49 and 50. A control transistor 51 is connected at its base to the bridge terminal between the resistors 49 and 50 and at its emitter to the bridge terminal between the resistor 48 and thermistor 42. The collector of the control transistor 51 is connected by a lead 52 to the base of a power transistor 53 and to the power lead 45 through a resistor 54. The collector of the power transistor 53 is connected to the power lead 45 while the emitter thereof is connected to the input terminal of the bridge 47. The output terminal of the bridge is connected to the ground lead 46.

The second thermistor 43 is connected in a circuit that is the same as the thermistor 42 and which includes a bridge 55, a control transistor 56 and a power transistor 57.

In the operation of the circuit, when electrical power is supplied from the power lead 45 through the resistor 54 to the base of the power transistor 53, the transistor 53 begins to conduct, and voltage is applied to the input terminal of the bridge. The base voltage of the control transistor 51 is less than the emitter voltage so the transistor 51 is not conducting. With power in the bridge 47, the thermistor 42 begins to heat and its resistance begins to drop. As the current in the thermistor leg of the bridge 47 thus increases, the voltage drop across the resistor 48 increases until the voltage at the bridge terminal connected to the emitter of the control transistor 51 is equal to the base voltage. The control transistor 51 then begins to conduct and to lower the voltage at the base of the power transistor 53 to reduce the power supplied to the bridge 47 until an equilibrium is established, that is, until the current in the thermistor leg of the bridge is adequate only to generate heat in the thermistor at a rate that matches the rate at which heat is dissipated from the thermistor 42.

With the bridge 47 in equilibrium, when the jet impinging upon the thermistor 42 shifts in a direction to increase or decrease the rate at which the heat is dissipated from the thermistor 42, the thermistor 42 tends to become hotter or cooler so that its resistance decreases or increases respectively, and the circuit responds to maintain equilibrium.

The circuit for thermistor 43 responds in the same manner as that of the thermistor 42. The output of the device is taken by comparing the voltages at the input terminals of the bridges 47 and 55, which may be provided by a pair of output transistors 58 and 59 with the output, indicated at 60, connected between the collector leads thereof.

In the operation of the instrument, the jet that is discharged by the nozzle 16, travels endwise of the jet chamber 8 and impinges upon the thermistors 22. When properly adjusted, the jet is centered relative to the thermistors so that the cooling imposed on the two thermistors is substantially equal. Upon angular movement of the instrument during the time that a particular increment of jet fluid is in transit, the thermistors 22 are displaced laterally from the positions at the time that the particular increment of jet fluid was discharged by the nozzle. Thus, this increment of jet fluid will engage the thermistors in a noncentered condition with the amount and direction of the displacement from the centered condition indicating the direction and the angular rate of the turn.

In an instrument for indicating angular movement in a plane of sensitivity, that is the plane defined by the axis of the nozzle 16 and the two thermistors 22 (which is the vertical plane of the section in FIG. 1), any difference in the density of the jet fluid and the vent fluid, that is, the fluid passing through the vents 17 into the jet-surrounding space in the jet chamber 8, will deflect the jet relative to the thermistors 22 in the same manner as an angular movement. Such a density difference may result from a temperature differential between the two fluids and may produce a deflection since, through buoyancy or gravity, a fluid under the influence of gravity or acceleration will tend to rise in a more dense atmosphere and to settle in a less dense atmosphere. Gravity sensitivity produced by a temperature or density differential between the two fluids can be substantially eliminated by supplying both fluids from a common source, and that is, by opening the inlet ends of both the nozzle 16 and the vents 17 into the plenum chamber 13 as disclosed in the above-noted application, Ser. No. 632,238.

With an instrument of the type herein illustrated, there is some residual actual or apparent gravity sensitivity which may be evidenced by migration of the zero or no-turn reading at the different positions of the instrument as it is tumbled about an axis normal to its axis of sensitivity. In such a test, apparent gravity sensitivity is evidence by minimum error when the jet is directed vertically either up or down, and by maximum error when the jet is directed horizontally. This apparent gravity sensitivity may be a function of local convection currents in the vicinity of the thermistors, that is, fluid heated by the thermistors tends to rise, which in turn imposes complementary downdrafts in advance of the thermistors. The maximum error occurs when the thermistors are vertically oriented so that the convection currents from the one reinforces those of the other.

The apparent gravity sensitivity that has been found usually produces a reaction in the illustrated instrument that is similar to that which results when the jet fluid is more dense than the surrounding fluid through which it is traveling. In accordance with this invention, this residual sensitivity may be neutralized by heating the fluid supplied to the jet relative to that supplied through the vents 17 to the surrounding space. In this manner, the density of the jet fluid is adjusted to counteract the actual or apparent gravity-induced deflection with the result that the zero setting or reading is substantially the same in the different positions of the instrument.

This adjustment for a jet having the appearance of a jet that is more dense than the surrounding fluid involves heating the fluid supplied to the jet relative to that supplied to the surrounding space, thereby effecting a relative reduction in the density of the fluid in the jet. To effect the desired heating, there is provided an electrical heating element 61 which may be a conventional patch-type strain gauge that is secured to the face of the end plate 11 in the plenum chamber 13. The heating element 61 is adapted to be heated when electrical power is supplied thereto and, for this purpose, the element 61 may be connected, as illustrated in FIG. 4, between the power lead 45 and ground lead 46 together with a rheostat 62 for varying the power supplied to the heating element 61. The heating element 61 is disposed directly opposite the inlet end of the nozzle 16 and is relatively small so that is does not significantly overlap with the vents 17. Thus, the fluid delivered by the inlets 14 to the plenum chamber 13 has a greater exposure to the heating element 61 in passing to the nozzle 16 than to the vents 17 so that the jet fluid will have a higher temperature and a lower density than the surrounding fluid.

To provide gravity or acceleration sensitivity, the heating element 61 may be energized to provide a predetermined temperature differential such as 1° F. between the fluid in the jet and that in the surrounding space. With a specific temperature differential between the two fluids, the jet will be deflected from a centered condition relative to the thermistors 22 by an amount that is directly proportional to be acceleration of the instrument along an axis of sensitivity, that is, in a direction normal to the jet axis and in a plane defined by the jet axis and the two thermistors 22. The jet deflection is a function of the temperature differential and not the temperature so that it is operable over a relatively large temperature range.

While the temperature adjustment afforded by the heating element 61 increases the temperature of the jet fluid relative to the surrounding fluid, other adjustments can provide the same ultimate effects. For example, means may be provided for cooling the jet fluid relative to the surrounding fluid, although this approach is normally more complex. Another alternative to compensate for an apparently light jet fluid is to raise the temperature of the surrounding fluid by heating means provided at the vents 17 in the nozzle member 9 or in a separate fluid supply for the surrounding fluid, or by directing the output of the pump means into the plenum chamber adjacent to the nozzle and by flowing the fluid to the vents 17 outwardly over an annular heating element.

The preferred fluid for both the jet and the jet-surrounding space is air but other fluids such as helium may be used and in some instances may be preferred.

By way of example, an instrument in accordance with this invention may comprise a nozzle 16 that is one-eighth of an inch in diameter. The thermistors may be spaced from the nozzle a distance that may be, for example, as little as one-half of an inch, the actual spacing being a function primarily of the jet velocity and the desired range or sensitivity of the instrument. With the thermistors spaced, for example, a distance of about one-half an inch from a ⅛-inch nozzle, the thermistors are spaced apart a distance of a little over one-eighth of an inch to place them on opposite sides of the centerline of the jet in the area radially of the jet where there is a substantially linear variation in the jet velocity. The posts 23 in such an arrangement are preferably about one-tenth of an inch high. The fluid pressure at the plenum chamber 13 is about 0.0005 p.s.i., which will maintain a jet velocity with air of about 100 inches per second and a flow rate of less than 2 cubic feet per hour. The Reynolds number of the fluid at the nozzle is between 400 and 1,000 to provide laminar flow in the jet. The heater 61 is designed to maintain a temperature differential of about 2° or 3° Fahrenheit between the fluid at the nozzle and at the bores 17.

What I claim and desire to protect by Letters Patent is:

1. A fluid-jet-deflection-type instrument comprising in combination:

a body having a single jet chamber, nozzle means having a nozzle for directing a fluid jet endwise of the jet chamber and having vents surrounding said nozzle for introducing fluid into said jet chamber in the space surrounding the jet, sensing means disposed in said jet chamber remote from said nozzle and symmetrically relative to the axis thereof, said body having exhaust means beyond said sensing means relative to said nozzle for exhausting fluid from said jet chamber, means defining a plenum chamber and said nozzle and said vents having the intake ends thereof open into said plenum chamber, means for recycling the fluid exhausted from said jet chamber under pressure into said plenum chamber, and an electrical heating element disposed within the plenum chamber directly opposite the nozzle intake and spaced from the vents whereby the fluid delivered to said nozzle has a greater exposure to the heating element in passing to the nozzle intake than to the vents thereby establishing a predetermined temperature differential for adjusting the buoyancy of the fluid jet from the nozzle relative to the surrounding fluid from the vents to reduce or neutralize gravity sensitivity or to induce acceleration sensitivity of the instrument.

2. A fluid-jet-deflection-type instrument in accordance with claim 1 in which said sensing means comprises a pair of spaced sensing elements electrically heated to an operating temperature.

3. A fluid-jet-deflection-type instrument in accordance with claim 1 in which said sensing elements comprise a pair of thermistors.

4. A fluid-jet-deflection-type instrument in accordance with claim 1 in which said means for recycling the fluid comprises pump means in said body at the end of said jet chamber opposite from said nozzle means, said pump means being connected at its intake to said exhaust means and being connected at its output to said plenum chamber by means including a plurality of bores through said body, said bores being equally spaced angularly about the periphery of said jet chamber.

* * * * *